(12) United States Patent
Jair et al.

(10) Patent No.: US 7,233,986 B1
(45) Date of Patent: Jun. 19, 2007

(54) METHOD AND APPARATUS FOR ACCESSING MANAGEMENT INFORMATION BASE DATA

(75) Inventors: Hsinlun Jair, Fremont, CA (US); Jim Mangin, San Ramon, CA (US)

(73) Assignee: Redback Networks Inc., San Jose, CA (US)

( * ) Notice: Subject to any disclaimer, the term of this patent is extended or adjusted under 35 U.S.C. 154(b) by 840 days.

(21) Appl. No.: 10/251,504

(22) Filed: Sep. 20, 2002

Related U.S. Application Data

(60) Provisional application No. 60/403,348, filed on Aug. 14, 2002.

(51) Int. Cl.
*G06F 15/173* (2006.01)
(52) U.S. Cl. .................. 709/223; 709/212; 709/226
(58) Field of Classification Search ............. 709/212, 709/223, 226; 711/3, 100, 170
See application file for complete search history.

(56) References Cited

U.S. PATENT DOCUMENTS 5,907,696 A * 5/1999 Stilwell et al. ............. 703/13
6,130,891 A * 10/2000 Lam et al. .................. 370/401
6,892,245 B1 * 5/2005 Crump et al. ............... 709/238
2002/0035626 A1 * 3/2002 Higuchi ...................... 709/223

OTHER PUBLICATIONS

C. Brown, F. Baker, C. Carvalho, Management Information Base for Frame Relay DTEs, Request for Comments (RFC): 1315, Apr. 1992, pp. 1-19.
F. Baker, C. Kolb, Definitions of Managed Objects for the DS1 Interface Type, Request for Comments (RFC): 1232, May 1991, pp. 1-28.
S. Waldbusser, Token Ring Extensions to the Remote Network Monitoring MIB, Request for Comments (RFC): 1513, Sep. 1993, pp. 1-55.

* cited by examiner

*Primary Examiner*—David Wiley
*Assistant Examiner*—Phuoc H Nguyen
(74) *Attorney, Agent, or Firm*—Blakely, Sokoloff, Taylor & Zafman LLP

(57) ABSTRACT

A method and apparatus for accessing management information base data is described. A method in a network element comprises collecting a first set of management information base (MIB) data in a framer's memory, maintaining a second set of MIB data that is periodically updated with the first set of MIB data, wherein the second set of MIB data is maintained separately from the first set of MIB data; and, in response to a request for the MIB data, transmitting the second set of MIB data.

43 Claims, 19 Drawing Sheets

METHOD AND APPARATUS FOR ACCESSING MANAGEMENT INFORMATION BASE DATA

CROSS-REFERENCE TO RELATED APPLICATIONS

This application claims the benefit of U.S. Provisional Patent Application No. 60/403,348, entitled "Method and Apparatus for Accessing Management Information Base Data" filed on Aug. 14, 2002.

BACKGROUND OF THE INVENTION

1. Field of the Invention

The invention relates to the field of communication. More specifically, the invention relates to communication networks.

2. Background of the Invention

A network element collects statistical information about traffic traversing the network element for numerous reasons, such as traffic shaping, providing feedback information to customers, etc. The statistical information, or traffic characteristic data, forms what is referred to as a management information base (MIB). There are two types of these MIBs: a periodic MIB (PMIB) and a demand MIB (DMIB). A PMIB includes data required by certain industry standards to be maintained. The DMIB includes data tailored to a customer and/or proprietary data defined by the manufacturer of a given network element. The PMIB is constantly maintained and updated at given intervals and is typically accessed to display to a network administrator or for transmission to a local or remote network management protocol process (e.g., SNMP). The DMIB is typically accessed in response to a user request (e.g., network administrator).

FIG. 1 (Prior Art) is a diagram of a forwarding engine card pulling data from an input/output (I/O) card. In FIG. 1, a forwarding engine card 121 includes a packet processing module 105, memory 107, and a forwarding engine (FE) controller 109. The FE card 121 is coupled with a shared bus 111. The shared bus 111 is also coupled with an input/output (I/O) card 113. The I/O card 113 includes an I/O controller 101 and a framer 103. The framer 103 includes a management information base (MIB) 117 in its memory.

The I/O card 113 receives traffic 115. The framer 103 processes the traffic 115. The framer 103 maintains data about the traffic 115, which is the MIB 117. The MIB 117 indicates certain statistics of the traffic 115 such as packet loss, packet throughput, used bandwidth, etc. The packet processing module 105 sometimes accesses the MIB 117.

To access the MIB 117, the packet processing module 105 pulls the MIB 117 from the framer 103. The pulling from the framer 103 by the packet processing module 105 is indicated by bolded lines 121A–121B. After pulling the MIB 117 from the framer 103, the packet processing module 105 writes the MIB 117 into the memory 107. As illustrated in the following Figures, pulling the MIB from the framer interrupts traffic processing.

FIG. 2 (Prior Art) is a flowchart of a packet processing module pulling an MIB. At block 203 of FIG. 2, the packet processing module stops processing traffic in response to a time period expiring. At block 205, the packet processing module submits a request to read the PMIB from a framer. At block 207, the packet processing module waits to receive the PMIB data. At block 209, the packet processing module writes received PMIB data to its memory. At block 211, the packet processing module determines if the entire PMIB has been read. If the entire PMIB has not been read, then control flows back to block 209. If the entire PMIB has been read, control flows to block 213. At block 213, the packet processing module resumes processing traffic.

FIG. 3A (Prior Art) is a diagram of the FE controller processing a read request from the PPM. At block 301, the FE controller submits the PPM's read request onto a PCI bus to the framer. At block 303, the FE controller pulls as much of the PMIB up to the FE controller's buffer limit from the I/O card across the shared bus. At block 305, the FE controller provides the PMIB data to the PPM. At block 307, the FE controller determines if the entire PMIB has been pulled. If the entire PMIB has not been pulled, control flows back to block 303. If the entire PMIB has been pulled, then control flows to block 309. At block 309, the FE controller informs the PPM that the entire PMIB has been pulled.

FIG. 3B (Prior Art) is a flowchart of the framer servicing a read request from the PPM. At block 313, the framer stops processing traffic in response to a read request from the PPM. At block 315, the framer reads the PMIB data from its register(s). At block 317, the framer provides as much of the PMIB data up to the buffer limit of the FE controller to the FE controller. At block 319, the framer determines if the entire PMIB has been pulled. If the entire PMIB has been pulled, then control flows to block 321. If the entire PMIB has not been pulled, then control flows to block 315. At block 321, the framer resumes processing traffic.

FIG. 4 (Prior Art) is a flowchart for a forwarding engine to service a PMIB request from the control engine (CE). At block 403, the PPM stops processing traffic in response to a PMIB request from the CE. At block 405, the PPM packetizes the PMIB. At block 407, the PPM transmits the packetized PMIB to the CE. At block 409, the PPM resumes processing traffic.

FIG. 5 (Prior Art) is a flowchart for the PPM to service a DMIB request from the CE. At block 503, the PPM stops processing traffic in response to a DMIB request from the CE. At block 505, the PPM submits a read request to the framer for the DMIB. At block 507, the PPM waits for the complete DMIB to be written into its memory. At block size 509, the PPM packetizes the DMIB. At block 510, the PPM transmits the packetized DMIB to the CE. At block 511, the PPM resumes processing traffic.

FIG. 6 (Prior Art) is a flowchart for a framer to service a DMIB request from a PPM. At block 603, the framer stops processing traffic in response to a DMIB request from the PPM. At block 605, the framer reads as much of the DMIB into the FE controller's buffer limit and transmits the DMIB data to the FE controller. At block 607, the framer determines if the entire DMIB has been read. If the entire DMIB has not been read, then control flows back to block 605. If the entire DMIB has been read, then the framer resumes processing traffic at block 609.

As illustrated in the above figures, accessing an MIB (either PMIB or DMIB) interrupts traffic processing in the forwarding engine card and the I/O card. Traffic is slowed and packets possibly lost while the PPM and the framer handle requests for the MIB.

BRIEF SUMMARY OF THE INVENTION

A method and apparatus for accessing management information base data is described. According to one aspect of the invention, a method in a network element provides for collecting a first set of management information base (MIB) data in a framer's memory and maintaining a second set of MIB data that is periodically updated with the first set of MIB data. The second set of MIB data is maintained separately from the first set of MIB data. Furthermore, in response to a request for the MIB data, the second set of MIB data is transmitted.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Figure 1:
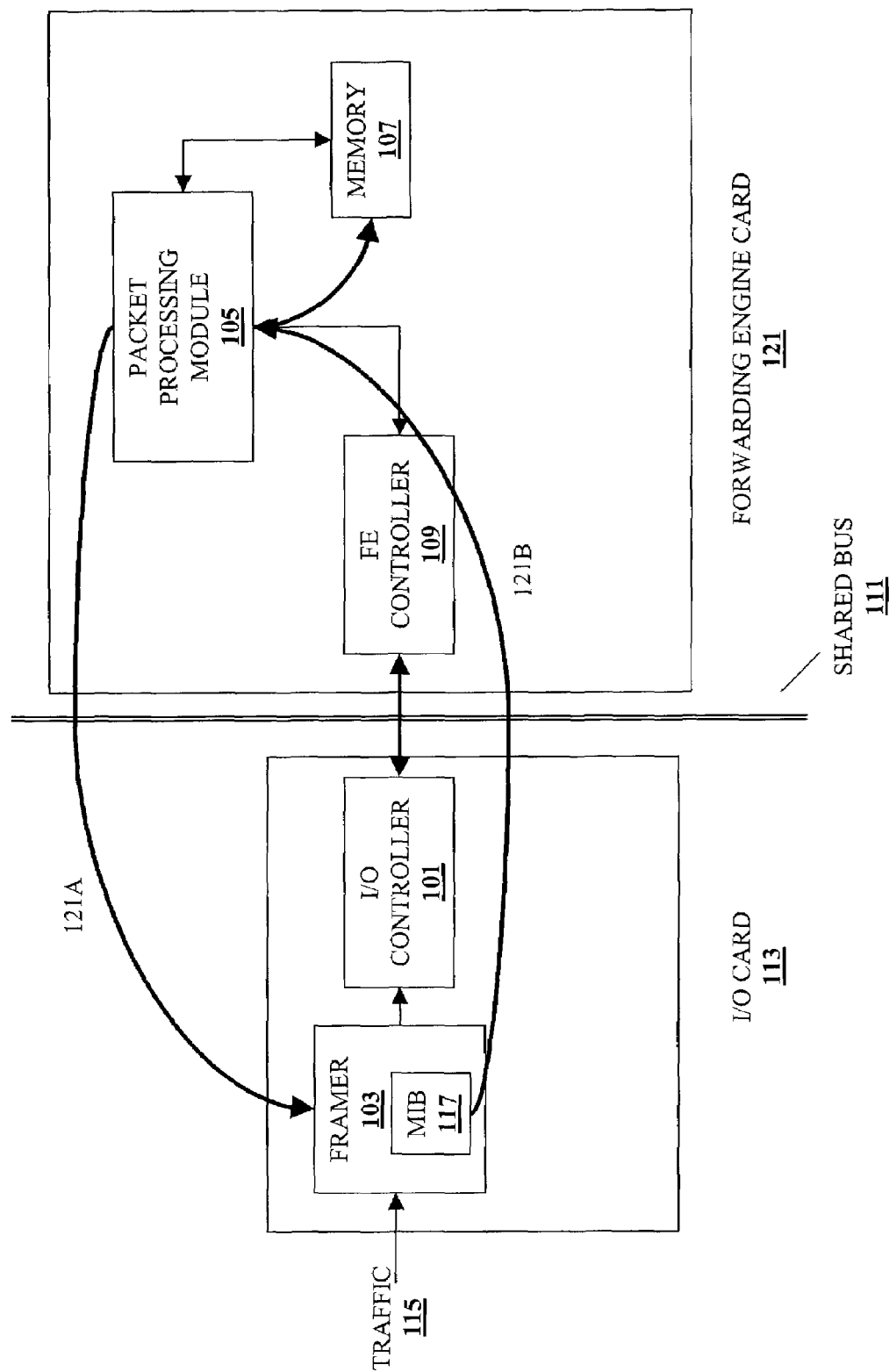
FIG. 1 (Prior Art) is a diagram of a forwarding engine card pulling data from an input/output (I/O) card.
Figure 2:
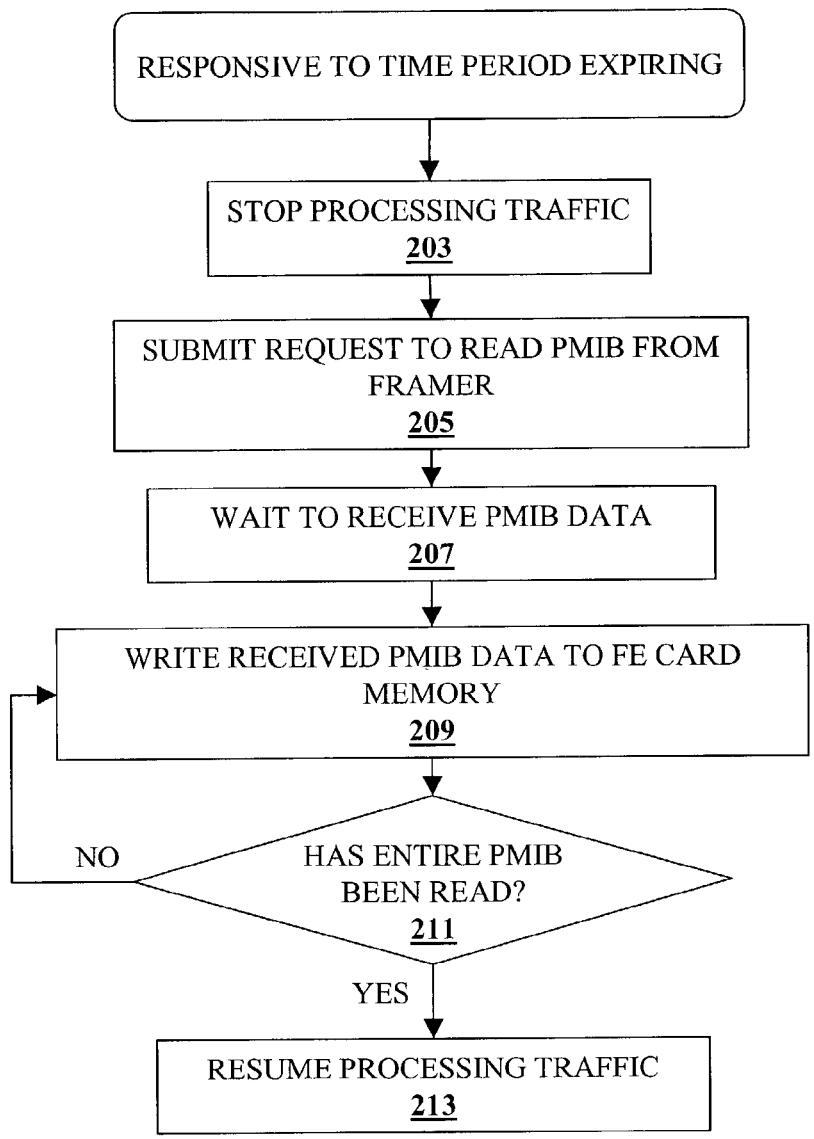
FIG. 2 (Prior Art) is a flowchart of a packet processing module pulling an MIB.
Figure 3A:
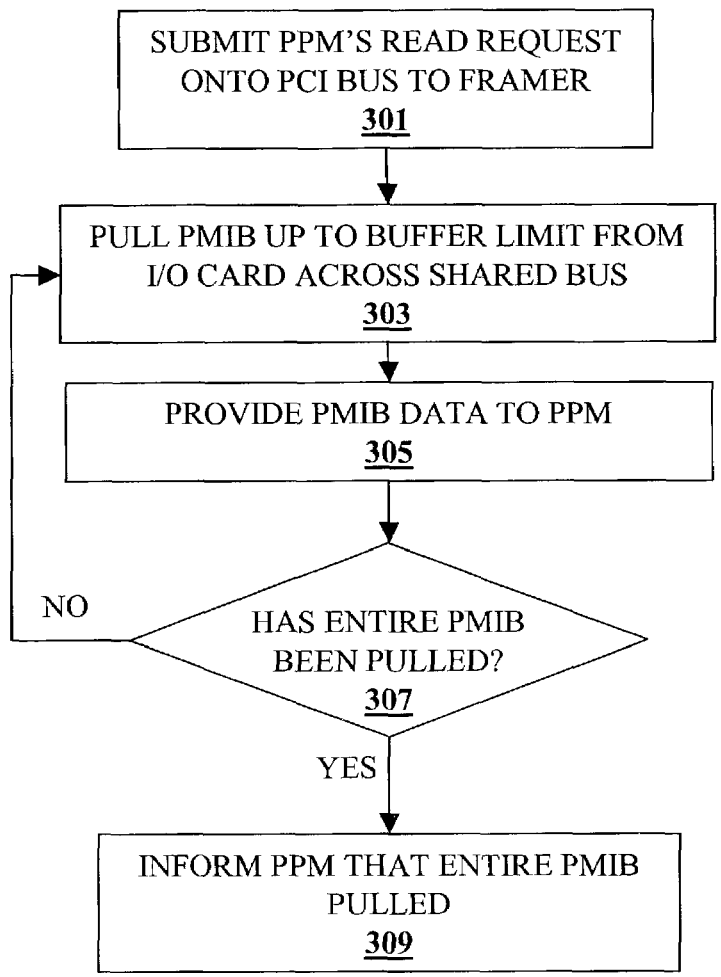
FIG. 3A (Prior Art) is a diagram of the FE controller processing a read request from the PPM.
Figure 3B:
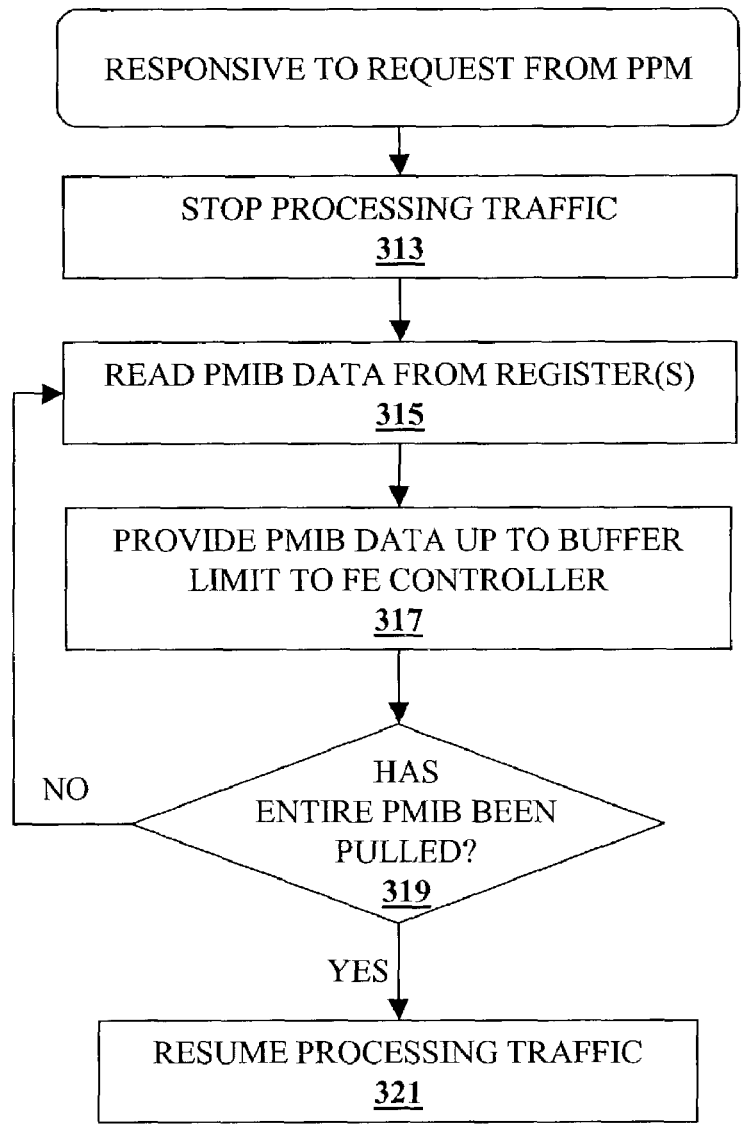
FIG. 3B (Prior Art) is a flowchart of the framer servicing a read request from the PPM.
Figure 4:
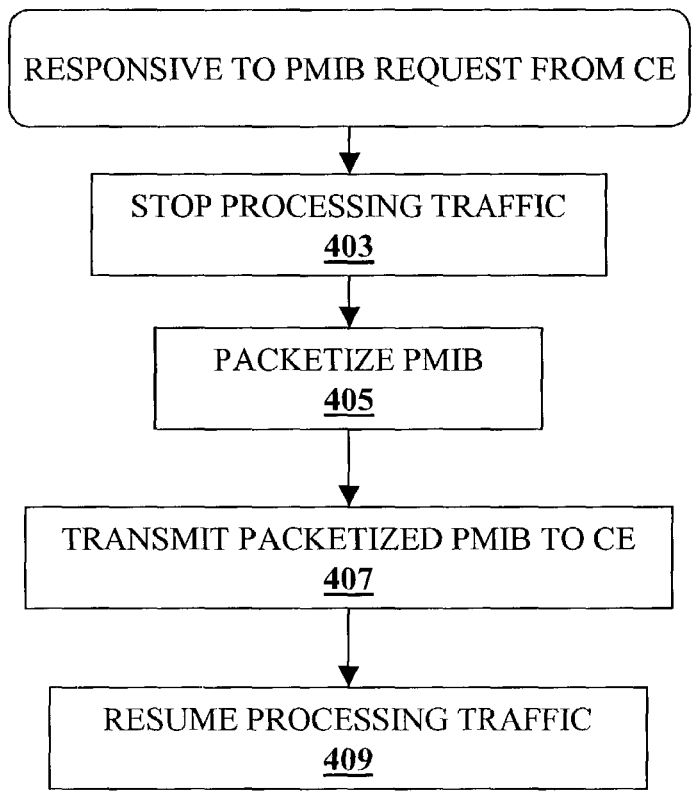
FIG. 4 (Prior Art) is a flowchart for a forwarding engine to service a PMIB request from the control engine (CE).
Figure 5:
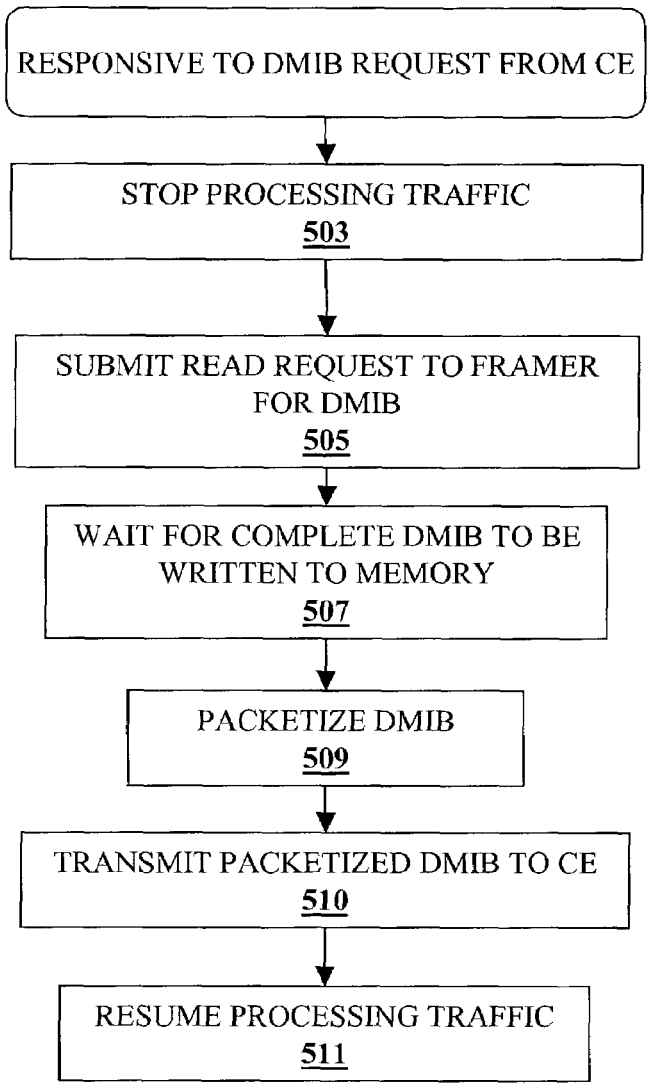
FIG. 5 (Prior Art) is a flowchart for the PPM to service a DMIB request from the CE.
Figure 6:
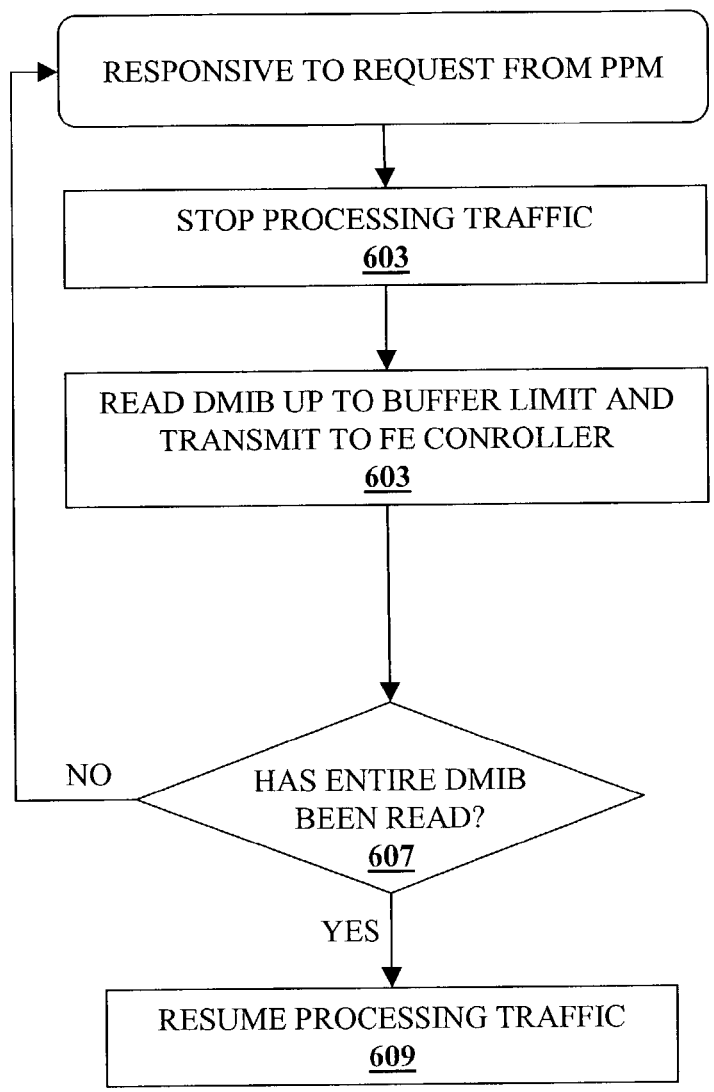
FIG. 6 (Prior Art) is a flowchart for a framer to service a DMIB request from a PPM.
Figure 7:
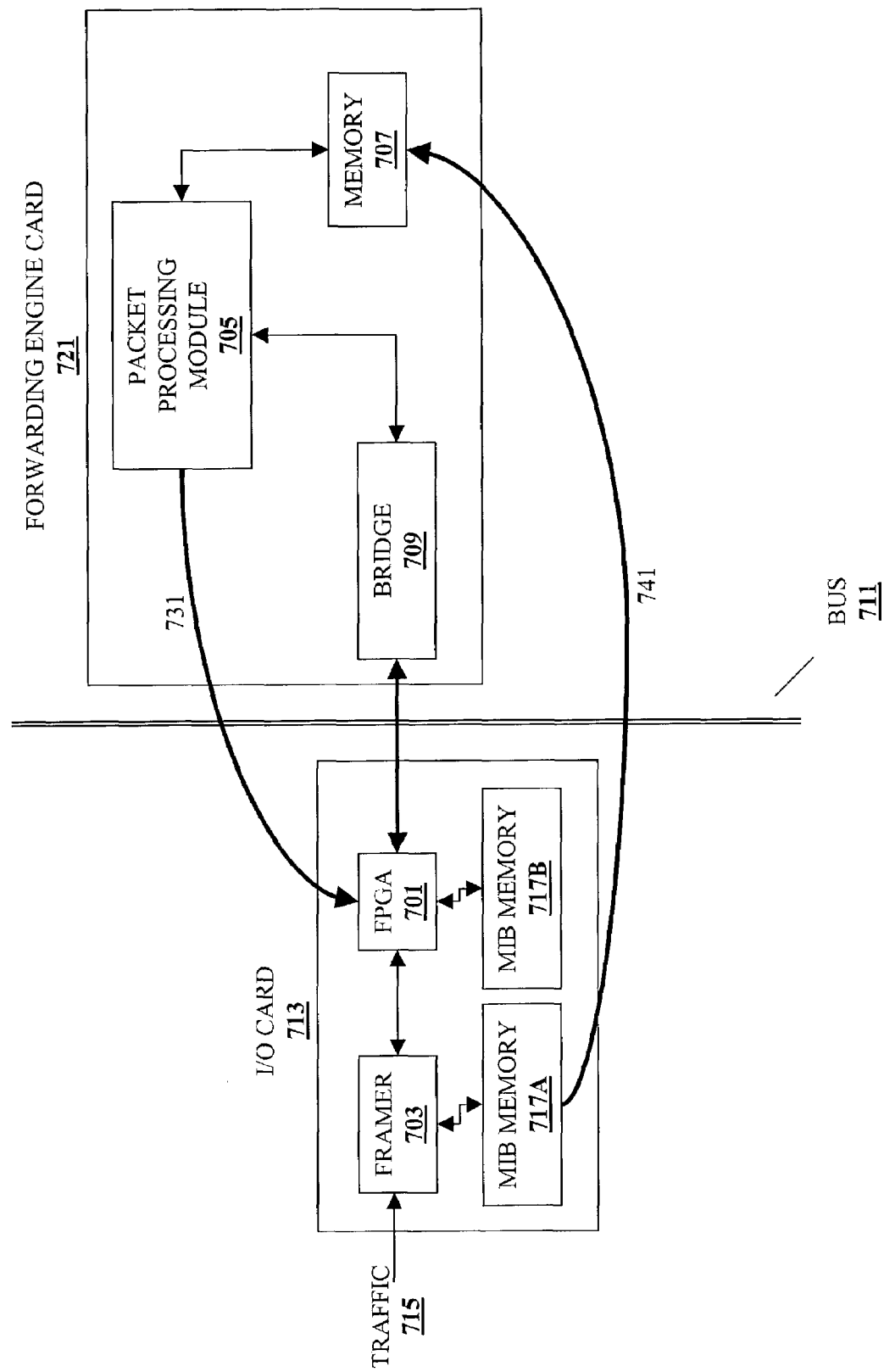
FIG. 7 is an exemplary diagram of interaction between a forwarding engine card and an I/O card according to one embodiment of the invention.

FIG. 7 is an exemplary diagram of interaction between a forwarding engine card and an I/O card according to one embodiment of the invention. In FIG. 7, a forwarding engine card 721 includes a packet processing module 705 (PPM), a bridge 709, and a memory 707. The PPM 705 is coupled with the bridge 709 and the memory 707. The forwarding engine card 721 is coupled with a bus 711 (e.g., PCI, ISA, LDT, etc). The I/O card 713 is also coupled to the bus 711.

The I/O card 713 includes a framer 703, a field programmable gate array (FPGA) 701, an MIB memory 717A, and an MIB memory 717B. The MIB memories 717A and 717B can be implemented with a variety of techniques. The MIB 717A and 717B may respectively be registers within the framer 703 and the FPGA 701, memory external to the framer 703 and the FPGA 701, registers within the framer 703 and memory external to the FPGA 701, etc. The framer 703 is coupled with the MIB memory 717A and the FPGA 701. The FPGA 701 is coupled with the MIB memory 717B.

Traffic 715 is received by the I/O card 713 and processed by the framer 703. The framer 703 stores MIB data (PMIB and/or DMIB) in the MIB memory 717A. The FPGA 701 collects MIB data from the memory 717A and maintains its own copy of the MIB data in the MIB memory 717B, which the FPGA 701 periodically updates from the MIB data stored in the MIB memory 717A. To access the MIB data on the I/O card 713, the PPM 705 posts a write request to the FPGA 701 via the bridge 709 as indicated by the bolded line 731. The FPGA 701 writes to the memory 707 whichever MIB was requested by the PPM 705 as indicated by the bolded line 741 (e.g., the FPGA 701 DMA writes the PMIB to the memory 707).

As illustrated in FIG. 7, the PPM 705 is no longer burdened with the task of retrieving MIB data from the framer 703. Instead, the FPGA 701 acts as intermediary and provides its own copy of the MIB data to the PPM 705. Neither the framer 703 nor the PPM 705 expends resources (e.g., cycles) accessing MIB data. Hence, packets are not slowed and/or lost by the framer or the PPM due to MIB retrieval.

FIGS. 8–11 will be described with reference to FIG. 7.

Figure 8A:
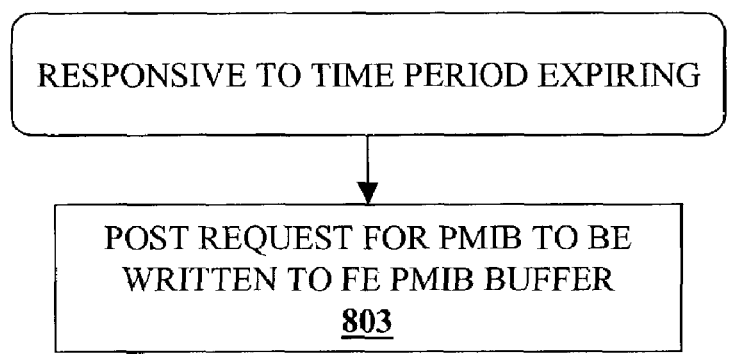
FIG. 8A is an exemplary flowchart for the PPM to request the PMIB from the I/O card according to one embodiment of the invention.
Figure 8B:
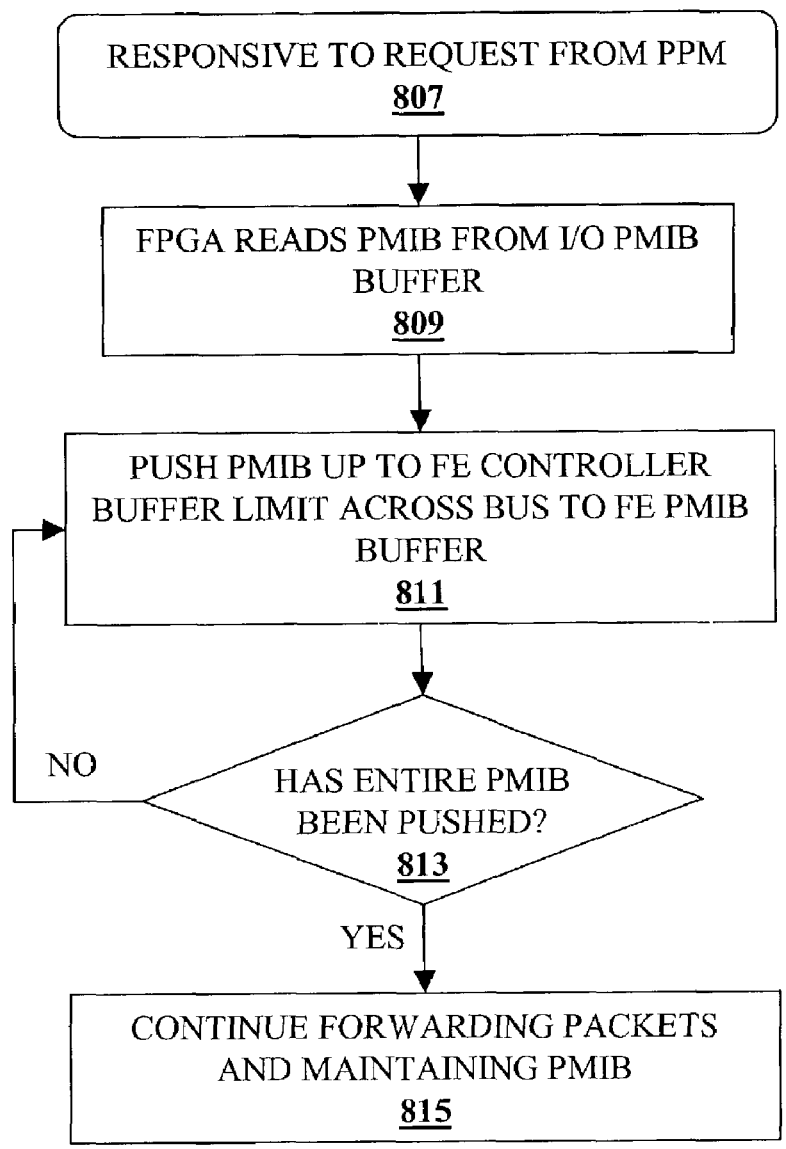
FIG. 8B is an exemplary flowchart for the FPGA to provide a PMIB to the PPM according to one embodiment of the invention.

FIGS. 8A–8B are exemplary flowcharts for a PPM to access a PMIB according to one embodiment of the invention. FIG. 8A is an exemplary flowchart for the PPM to request the PMIB from the I/O card according to one embodiment of the invention. At block 803, the PPM posts a request for the PMIB to be written to the FE PMIB buffer in response to a time period expiring. Referring to FIG. 7, the forwarding engine PMIB buffer would be allocated from the memory 707.

FIG. 8B is an exemplary flowchart for the FPGA to provide a PMIB to the PPM according to one embodiment of the invention. At block 809, the PMIB is read from the I/O PMIB buffer in response to the request from the PPM. Referring to FIG. 7, the I/O PMIB buffer would be allocated from the MIB memory 717B. Returning to FIG. 8B, as much of the PMIB up to the forwarding engine bridge's buffer limit is pushed across a bus to the forwarding engine PMIB buffer at block 811. At block 813, the FPGA determines if the entire PMIB has been pushed. If the entire PMIB has not been pushed, then control flows back to block 811. If the entire PMIB has been pushed, then control flows to block 815.

At block 815, the FPGA continues forwarding packets to the forwarding engine and maintaining the PMIB.

Figure 9:
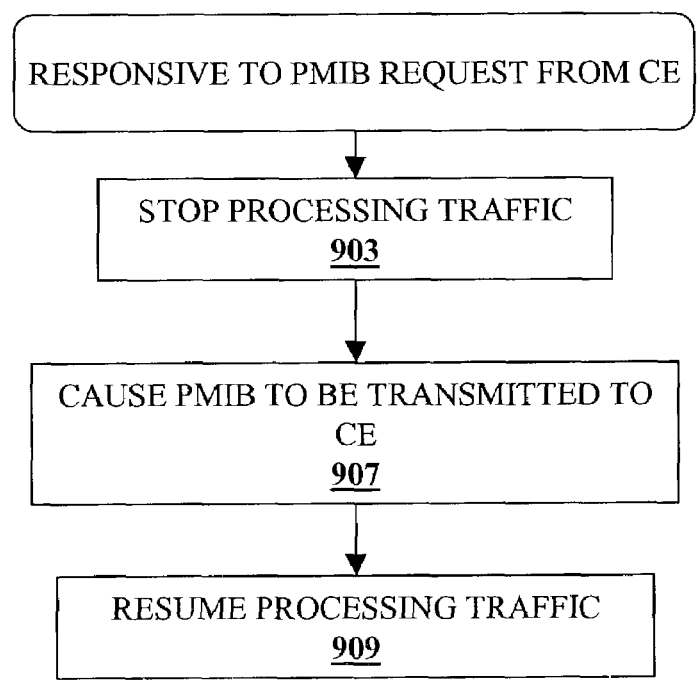
FIG. 9 is an exemplary flowchart for the PPM to service a PMIB request from a control engine according to one embodiment of the invention.

FIG. 9 is an exemplary flowchart for the PPM to service a PMIB request from a control engine according to one embodiment of the invention. At block 903, the PPM stops processing traffic in response to receiving a PMIB request from the control engine (CE). At block 907, the PPM causes the PMIB to be transmitted to the CE (e.g., the PPM packetizes the PMIB and transmits the packetized PMIB to the CE, the PPM communicates to the CE the PMIB's location and the CE pulls the PMIB, etc.). At block 909, the PPM resumes processing traffic.

Figure 10A:
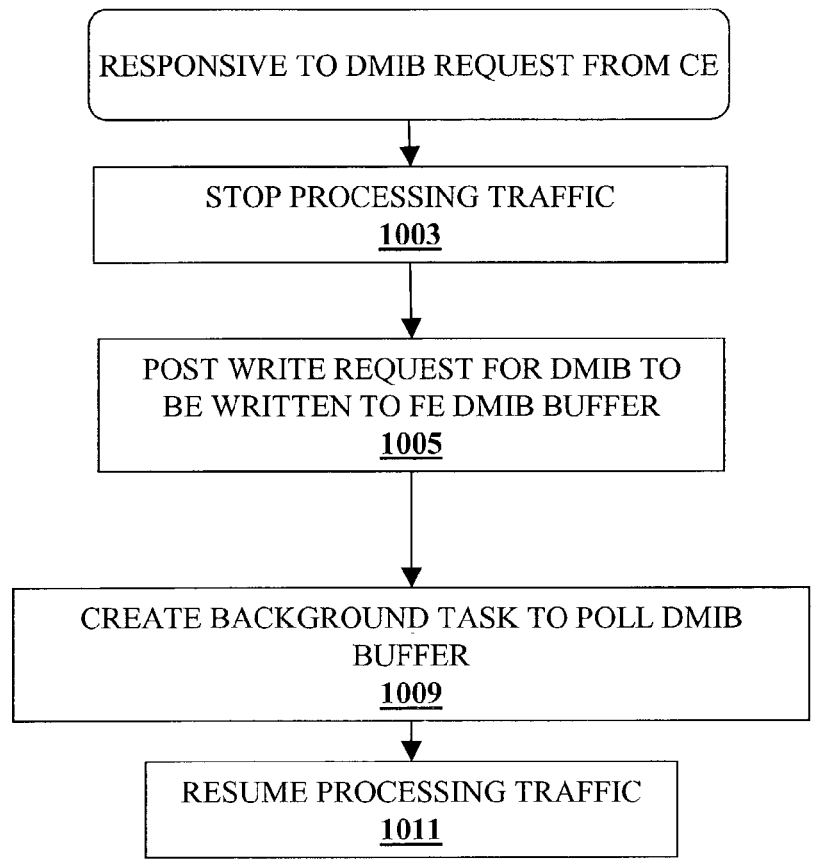
FIG. 10A is an exemplary flowchart for the PPM to handle a DMIB request from the CE according to one embodiment of the invention.
Figure 10B:
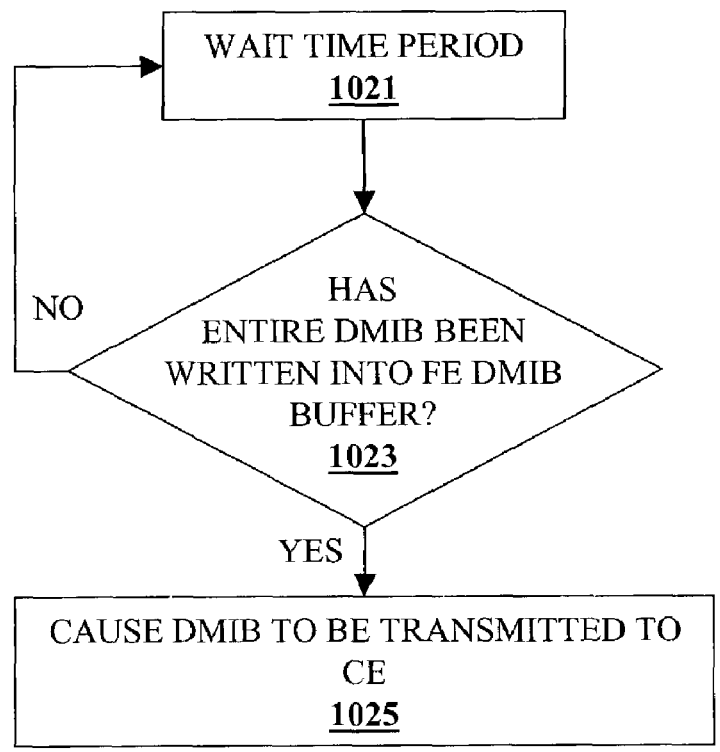
FIG. 10B is an exemplary flowchart for the background task created by the PPM to provide the DMIB to the CE according to one embodiment of the invention.

FIGS. 10A–10B are exemplary flowcharts for the PPM to service a DMIB request from a control engine according to one embodiment of the invention. FIG. 10A is an exemplary flowchart for the PPM to handle a DMIB request from the CE according to one embodiment of the invention. At block 1003, the PPM stops processing traffic in response to a DMIB request from the CE. At block 1005, the PPM posts a write request for the DMIB to be written to the forwarding engine DMIB buffer. Referring to FIG. 7, the forwarding engine DMIB buffer is allocated from the memory 707 in one embodiment of the invention. At block 1009, the PPM creates a background task(s) to poll the forwarding engine DMIB buffer. In an alternative embodiment of the invention, an interrupt is generated when the DMIB has been written. At block 1011, the PPM resumes processing traffic.

FIG. 10B is an exemplary flowchart for the background task created by the PPM to provide the DMIB to the CE according to one embodiment of the invention. At block 1021, the background task waits a time period. At block 1023, the background task determines if the entire DMIB has been written into the forwarding engine DMIB buffer. A variety of techniques can be used to determine if the entire DMIB has been written. IN one embodiment of the invention, a special value (e.g., bit, word, etc.) is written at the end of the DMIB. In another embodiment of the invention, the DMIB is of a fixed size. If the entire DMIB has not been written to the forwarding engine DMIB buffer, then control flows back to block 1021. If the entire DMIB has been written into the forwarding engine DMIB buffer, then control flows to block 1025. At block 1025, the background task causes the DMIB to be transmitted to the CE.

Figure 11:
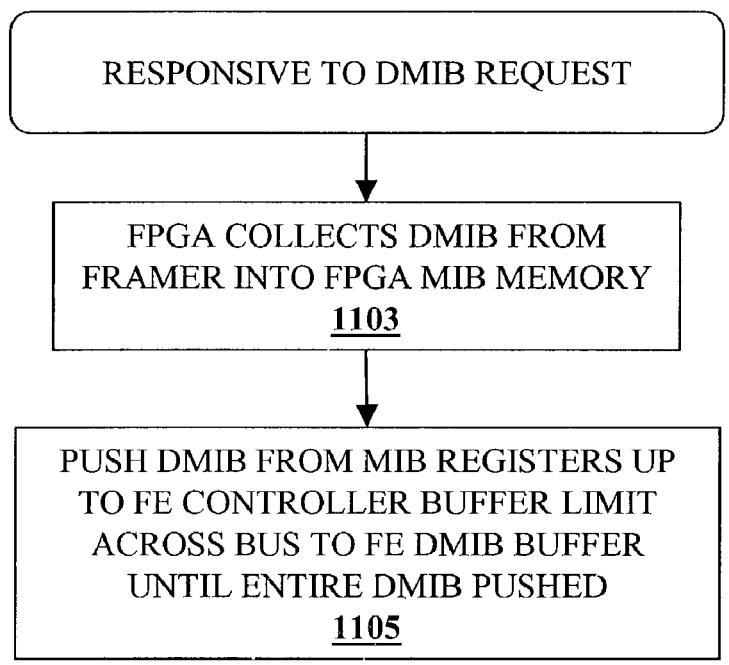
FIG. 11 is an exemplary flowchart for the FPGA to service a DMIB request from the PPM according to one embodiment of the invention.

FIG. 11 is an exemplary flowchart for the FPGA to service a DMIB request from the PPM according to one embodiment of the invention. At block 1103, the FPGA collects the DMIB from the framer into the FPGA MIB memory. Referring to FIG. 7, the FPGA 701 reads the DMIB from the MIB memory 717A and writes it into the MIB memory 717B in one embodiment of the invention. Returning to FIG. 11, the FPGA pushes as much of the DMIB from the FPGA MIB memory up to the forwarding engine bridge's buffer limit across the bus to the forwarding engine DMIB buffer until the entire DMIB has been pushed at block 1105. In an alternative embodiment of the invention, the FPGA maintains a copy of the DMIB as it does with the PMIB. Therefore, the FPGA would not have to access the DMIB through the framer each time the FPGA must service a DMIB request.

As can be seen from the Figures, requests for MIB data are handled more efficiently with the FPGA. Not only is a task removed from the PPM and the framer, but the FPGA provides MIB data from its own memory more quickly than accessing MIB data through the framer.

In addition to providing MIB data to the PPM, the described invention can be applied to interactions between the PPM and the CE. In an embodiment of the invention, the PPM informs the CE of the PMIB and/or the DMIB's location in FE memory. When the CE wants access to the PMIB, then the CE pulls the PMIB without interrupting the PPM. For the DMIB, the CE creates a background task to pull the DMIB location instead of the PPM creating a background task.

Figure 12:
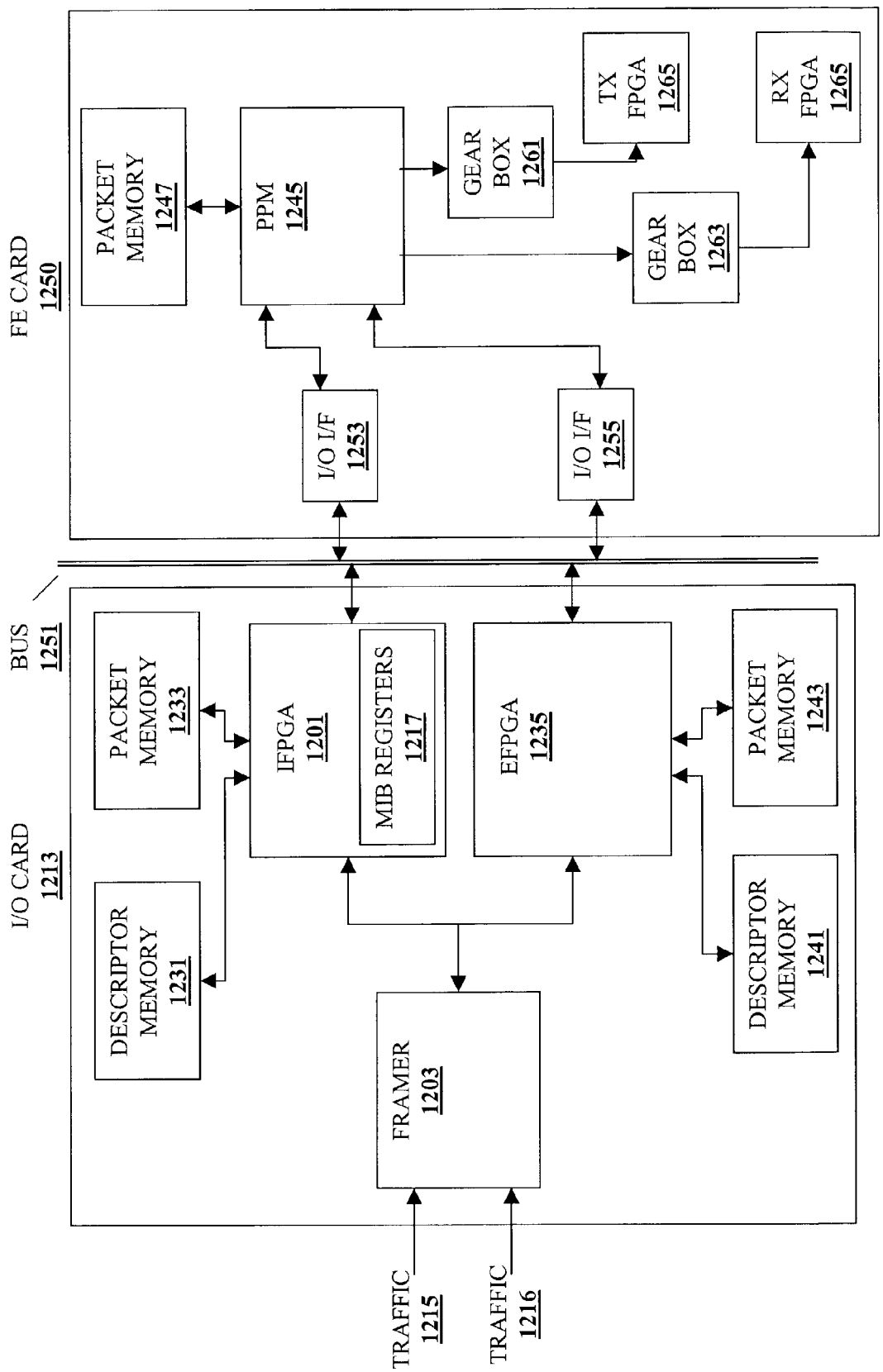
FIG. 12 is an alternative exemplary diagram illustrating an I/O card and an FE card according to one embodiment of the invention.

FIG. 12 is an alternative exemplary diagram illustrating an I/O card and an FE card according to one embodiment of the invention. In FIG. 12, an I/O card 1213 and an FE card 1250 are coupled with a bus 1251. The FE card 1250 includes a packet memory 1247, a PPM 1245, I/O interfaces 1253 and 1255, gearboxes 1261 and 1263, transmitt (TX) FPGA 1265, and a receive (RX) FPGA 1267. The PPM 1245 is coupled with the packet memory 1247, the I/O interfaces 1253 and 1255, and the gearboxes 1261 and 1263. The gearboxes 1261 and 1263 are respectively coupled with the TX FPGA 1265 and the RX FPGA 1267.

The I/O card 1213 includes a descriptor memory 1231, a packet memory 1233, an ingress FPGA (IFPGA) 1201, a framer 1203, an egress FPGA (EFPGA) 1235, a descriptor memory 1241, and a packet memory 1243. The IFPGA 1201 includes MIB registers 1217. The IFPGA 1201 is coupled with the bus 1251, the packet memory 1233, the descriptor memory 1231, and the framer 1203. That he FPGA 1235 is coupled with the bus 1251, the packet memory 1243, the descriptor memory 1241, and the framer 1203.

Figure 13:
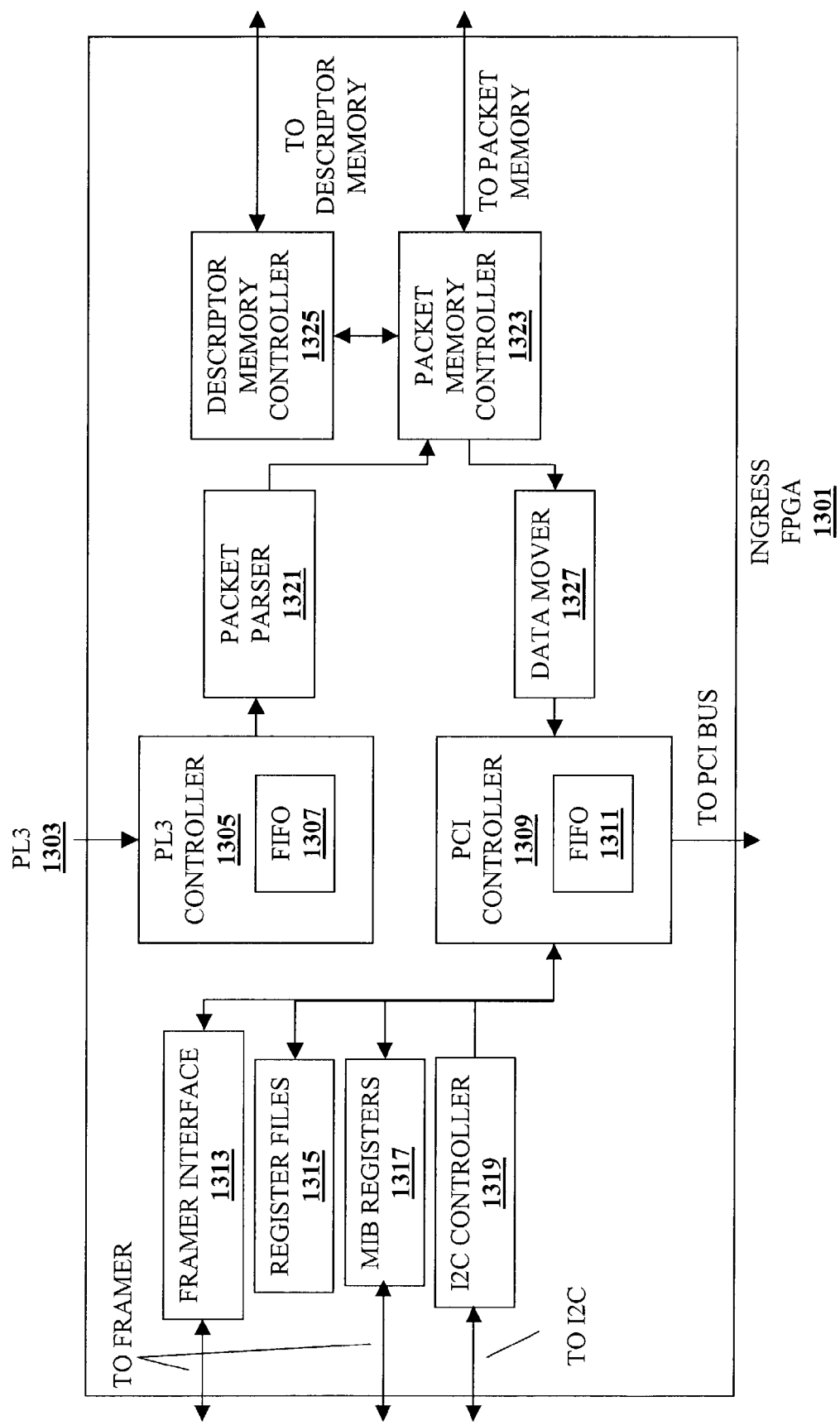
FIG. 13 an exemplary diagram of an IFPGA according to one embodiment of the invention.

FIG. 13 an exemplary diagram of an IFPGA according to one embodiment of the invention. An IFPGA 1301 includes a PL3 controller 1305 which is coupled with a PL3 line 1303. The PL3 controller 1305 includes a FIFO 1307. The PL3 controller 1305 is coupled with a packet parser 1321. The packet parser 1321 is coupled with a packet memory controller 1323. The packet memory controller 1323 is coupled with a descriptor memory controller 1325. The descriptor memory controller 1325 is coupled with a descriptor memory which is not shown in FIG. 13. The packet memory controller 1323 is also coupled with a packet memory (which is not illustrated in FIG. 13) and data mover 1327. The data mover 1327 is coupled with a PCI controller 1309, which includes a FIFO 1311. The PCI controller 1309 is coupled with a PCI bus which is not illustrated in FIG. 13. Referring to FIG. 12, the PCI controller 1309 is coupled with the bus 1251 in one embodiment of the invention. Returning to FIG. 13, the PCI controller 1309 is also coupled with a framer interface 1313, register files 1315, MIB registers 1317, and an I2C controller 1319.

The PL3 controller 1305 receives packets over the PL3 line 1303 from a framer. The PL3 controller 1305 passes packets to the packet parser 1321. The packet parser 1321 passes packets to the packet memory controller 1323. The packet memory controller 1323 stores packets in the packet memory and provides indices of stored packets to the descriptor memory controller 1325. The descriptor memory controller 1325 stores indices of stored packets. The packet memory controller 1323 passes packets to the data mover 1327. The data mover 1327 passes packets to the PCI controller 1309. From the PCI controller 1309, packets are passed across the PCI bus to the forwarding engine.

In addition to packet forwarding, the IFPGA 1301 maintains MIB data in the MIB registers 1317. The IFPGA 1301 maintains both the PMIB and the DMIB in the MIB registers 1317. The PCI controller 1309 sends requests for MIB data to the framer via the framer interface 1313. In response to the requests, the framer stores MIB data in the MIB registers 1317. When servicing requests from the forwarding engine, the PCI controller 1309 writes its MIB data from the MIB registers 1317 across the PCI bus to the forwarding engine.

The I/O cards and the FE cards described in the Figures include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other forms of propagated signals (e.g., carrier waves, infrared signals, digital signals, etc.), etc.

Figure 14A:
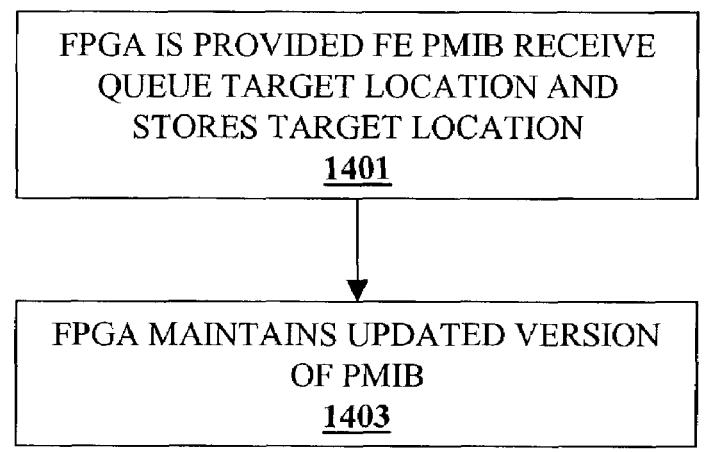
FIG. 14A is an exemplary flowchart for the IFPGA according to one embodiment of the invention.
Figure 14B:
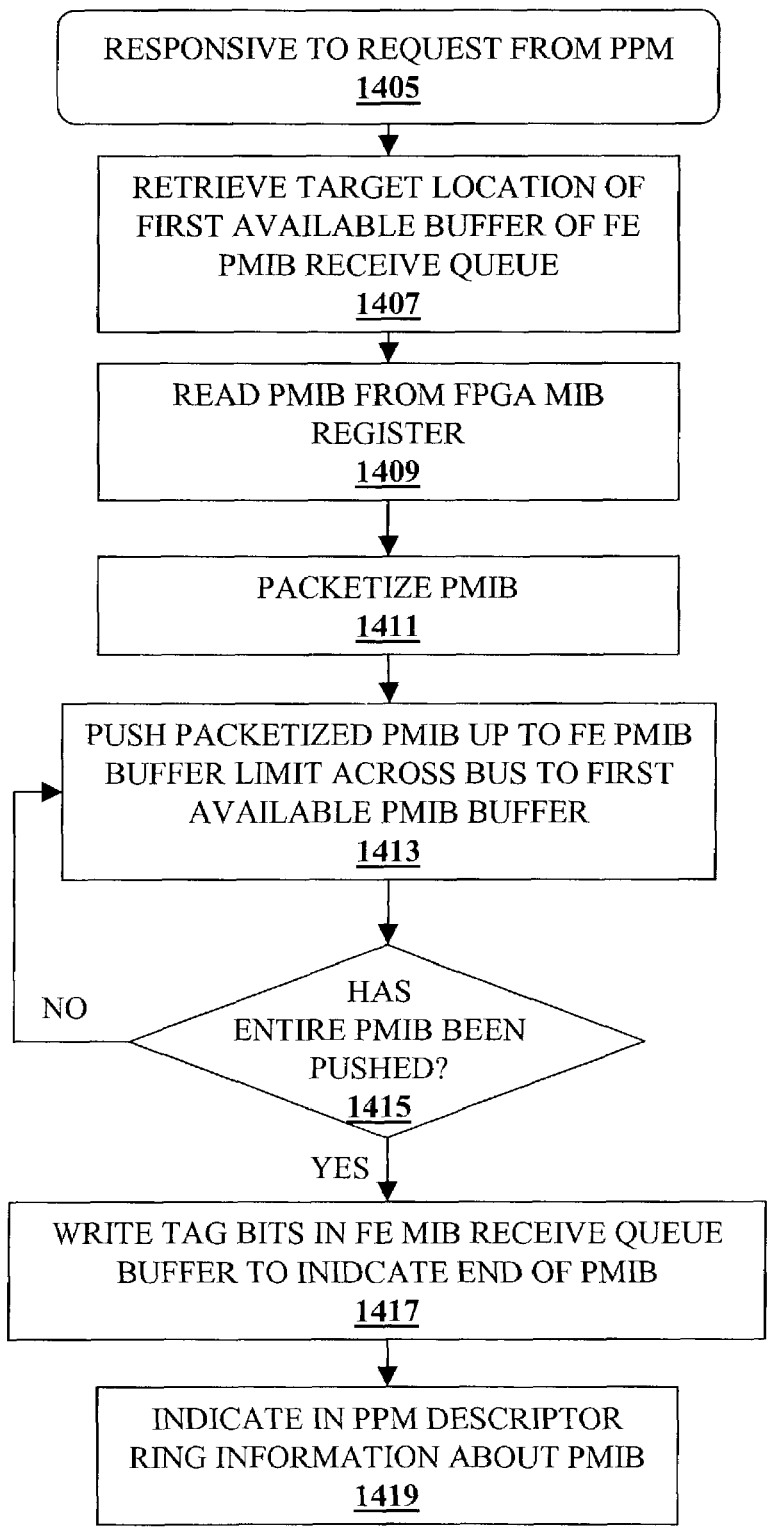
FIG. 14B is an exemplary flowchart for the IFPGA to service PMIB requests according to one embodiment of the invention.
Figure 15:
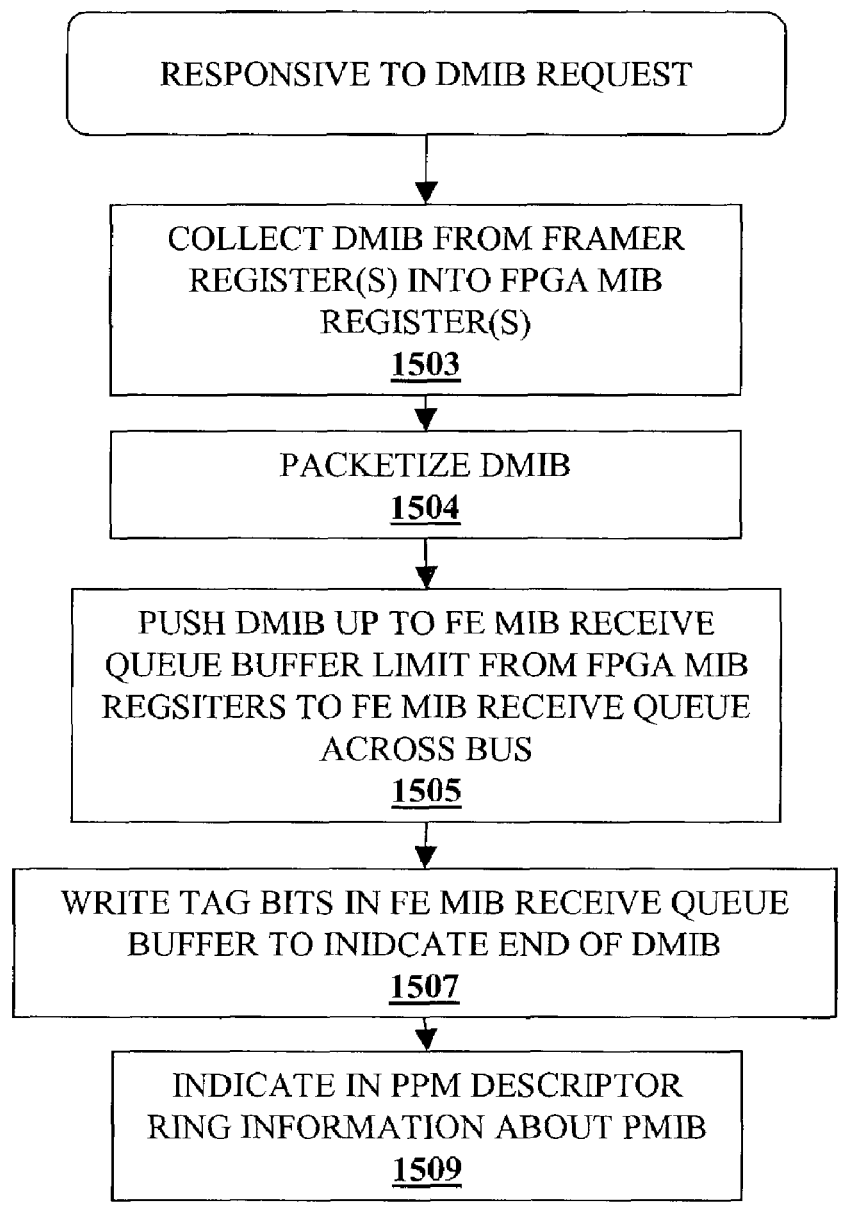
FIG. 15 is an exemplary flowchart for the IFPGA to service a DMIB request according to one embodiment of the invention.

FIGS. 14–15 are flowcharts for the IFPGA illustrated in FIG. 13 to provide MIB data to the forwarding engine according to one embodiment of the invention. FIGS. 14–15 will be described with reference to FIG. 13.

FIG. 14A is an exemplary flowchart for the IFPGA according to one embodiment of the invention. At block 1401, the IFPGA stores a target location of a forwarding engine PMIB receive buffer (e.g., a queue) that is provided by the forwarding engine. At block 1403, the IFPGA maintains an updated version of the PMIB.

FIG. 14B is an exemplary flowchart for the IFPGA to service PMIB requests according to one embodiment of the invention. At block 1407, a target location of a first available buffer of multiple forwarding engine PMIB receive buffers is retrieved in response to a PMIB request from the PPM. At block 1409, the PMIB is read from an IFPGA MIB register. At block 1411, the PMIB is packetized. The PMIB is packetized in accordance with configuration information entered previously. The configuration information may be default settings and/or initialization settings. In addition, a network administrator can modify this configuration information. At block 1413, as much of the packetized PMIB is pushed up to the forwarding engine PMIB buffer limit across the bus to the first available PMIB buffer. At block 1415, it is determined if the entire PMIB has been pushed across the bus. If the entire PMIB has not been pushed, then control flows back to block 1413. If the entire PMIB has been pushed, then control flows to block 1417.

At block 1417, tag bits are written into the FE MIB receive buffer to indicate the end of the PMIB. At block 1419, information about the PMIB is indicated in a PPM descriptor ring. Such information about the PMIB may include whether the PMIB spans multiple buffers, status, length of the PMIB, etc.

In one embodiment of the invention, when the IFPGA DMA writes the PMIB to the forwarding engine's memory, the IFPGA writes to a full cache line even though only one byte may remain to be written.

FIG. 15 is an exemplary flowchart for the IFPGA to service a DMIB request according to one embodiment of the invention. At block 1503 a DMIB is collected from framer register(s) into IFPGA MIB register(s) in response to a DMIB request. At block 1504, the DMIB is packetized. At block 1505, as much of the DMIB up to the FE MIB receive buffer limit is pushed (e.g., DMA write) from the IFPGA MIB register(s) to the FE DMIB receive buffer across the bus. At block 1507, tag bits are written into the FE MIB receive buffer to indicate the end of the DMIB. At block 1509, information about the DMIB is indicated in a PPM descriptor ring.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

We claim:

1. A method in a network element comprising:
    collecting a first set of management information base (MIB) data by a first processing circuit in a framer into a framer's memory, the first processing circuit to perform framing operations;
    maintaining by a second processing circuit a second set of MIB data that is periodically updated with the first set of MIB data by the second processing circuit, wherein the second set of MIB data is maintained separately from the first set of MIB data, and the second processing circuit is separate from the first processing circuit; and
    in response to a request for the MIB data, transmitting the second set of MIB data by the second processing circuit, and
    wherein the first set of MIB data is maintained by the first processing circuit of the framer while the second set of MIB data is maintained by the second processing circuit, the second processing circuit being a field programmable gate array.

2. The method of claim 1 wherein collecting comprises gathering statistical information about traffic traversing the network element.

3. The method of claim 1 wherein transmitting the second set of MIB data comprises direct memory access (DMA) writing the second set of MIB data.

4. The method of claim 1 further comprising writing a set of one or more tag bits at the end of the transmitted second set of MIB data, said set of tag bits indicating the end of the second set of MIB data.

5. The method of claim 1 further comprising:
    collecting a third set of MIB data in the framer's memory;
    in response to a request, collecting the third set of MIB data into a second memory; and
    transmitting the collected third set of MIB data from the second memory across a bus to a third memory.

6. The method of claim 1 wherein the transmitting comprises packetizing the second set of MIB data.

7. A method in a network element comprising:
    in response to a request for management information base (MIB) data, accessing a first set of MIB data that is maintained by a field programmable gate array (FPGA),
    wherein the MIB data is separate from a second set of MIB data that is used by the FPGA to periodically update the first set of MIB data;
    collecting the second set of MIB data by a framer into a framer's memory, the framer separate from the FPGA, the framer to perform framing operations and maintain the second set of MIB data; and direct memory access writing the first set of MIB data into a memory on a forwarding engine card by the FPGA.

8. The method of claim 7 further comprising packeting the first set of MIB data.

9. The method of claim 7 wherein the request is a write request from the forwarding engine card.

10. The method of claim 7 further comprising:
transmitting the first set of MIB data to a control engine from the memory on the forwarding engine card.

11. The method of claim 7 further comprising:
in response to a request from a control engine, communicating to the control engine the first set of MIB data's location in the memory on the forwarding engine card.

12. A method in a network element comprising:
maintaining a first and second set of management information base (MIB) data in separate memory locations, wherein the first set of MIB data is based on received packets processed by a first circuit and the second set of MIB data is maintained by a second circuit based on the first set of MIB data;
accessing the second set of MIB data by the second circuit in response to a request for MIB data;
creating a set of one or more packets by the second circuit based on the second set of MIB data; and
direct memory access writing the set of packets by the second circuit across a bus into memory on a forwarding engine card
wherein the first circuit maintains the first set of MIB data and the second circuit maintains the second set of MIB data,
wherein the first circuit is a processing circuit of a framer and the second circuit is a field programmable gate array (FPGA) separate from the first circuit, and
wherein the second MIB is periodically updated with the first MIB data.

13. The method of claim 12 wherein the request is a write request from the forwarding engine card transmitted to the FPGA, the write request being transmitted in response to a request from a control engine.

14. The method of claim 12 wherein the request is provided in response to a time period expiring.

15. The method of claim 12 further comprising providing the second set of MIB data from the memory to a control engine.

16. The method of claim 15 wherein providing the second set of MIB data comprises communicating to the control engine the location in the memory of the second set of MIB data.

17. The method of claim 15 wherein the providing comprises packetizing the second set of MIB data written into the memory and transmitting the packetized second set of MIB data from the memory to the control engine.

18. A network element comprising:
a bus;
a forwarding engine (FE) card coupled with the bus, the FE card to forward packets, the FE card including,
a packet processing module (PPM) to process packets and having a set of instructions to cause the PPM to post a write request for a management information base (MIB),
a bridge coupled with the PPM and the bus, the bridge to transmit requests across the bus and to receive data from the bus,
a memory coupled with the PPM, the memory to host the MIB; and an input/output (I/O) card coupled with the bus, the I/O card to receive and transmit packets and including,
a framer to collect and maintain MIB data;
an ingress field programmable gate array (iFPGA) coupled with and separate from the framer, the iFPGA to collect and maintain a copy of the MIB data, to periodically update its MIB data with the framer's MIB data and to service the write request from the PPM.

19. The network element of claim 18 wherein the forwarding engine card further includes:
a set of one or more gearboxes;
a transmit field FPGA; and
a receive FPGA.

20. The network element of claim 18 wherein the I/O card further includes:
an egress FPGA (eFPGA) coupled with the framer and the bus, the eFPGA to pass packets from the forwarding engine card to the framer;
a first packet memory coupled with the iFPGA;
a first packet descriptor memory coupled with the iFPGA;
a second packet memory coupled with the eFPGA; and
a second packet descriptor memory coupled with the eFPGA.

21. The network element of claim 18 wherein the iFPGA includes a set of one or more registers to host the MIB data.

22. The network element of claim 18 wherein the iFPGA includes:
a PL3 controller;
a packet parser coupled with the PL3 controller;
a packet memory controller coupled with the PL3 controller and the first packet memory;
a descriptor memory controller coupled with the first descriptor memory;
a data mover coupled with the packet memory controller;
a bus controller coupled with the data mover, the bus controller including a first in first out buffer; and
a framer interface coupled with the bus controller and the framer.

23. A machine-readable storage medium that provides instructions, which when executed by a set of one or more processors, cause said set of processors to perform operations comprising:
posting a write request for a first set of management information base (MIB) data;
communicating the write request to a field programmable gate array (FPGA) that maintains the first set of MIB data based on a second set of MIB data maintained by a framer circuit separate from the FPGA; and
direct memory access writing the set of MIB data to a memory on a forwarding engine card,
wherein the first set of MIB data is periodically updated from the second set of MIB data, and
wherein the FPGA collects the first set of data and the framer circuit collects the second set of data.

24. The machine-readable medium of claim 23 wherein the write request is in response to a time period expiring.

25. The machine-readable medium of claim 23 wherein the write request is in response to receiving a MIB request from a control engine.

26. The machine-readable medium of claim 23 further comprising packetizing the set of MIB data for writing to the memory.

27. A machine-readable storage medium that provides instructions, which when executed by a set of one or more processors, cause said set of processors to perform operations comprising:

collecting a first set of management information base (MIB) data by a first processing circuit in a framer's memory, the first processing circuit to perform framing operations;

maintaining by a second processing circuit a second set of MIB data that is periodically updated with the first set of MIB data by the second processing circuit, wherein the second set of MIB data is maintained separately from the first set of MIB data, and the second processing circuit is separate from the first processing circuit;

in response to a request for the MIB data, transmitting the second set of MIB data by the second processing circuit, wherein the first set of MIB data is maintained by the framer while the second set of MIB data is collected by the second processing circuit, the processing circuit being a field programmable gate array.

28. The machine-readable storage medium of claim 27 wherein collecting comprises gathering statistical information about traffic traversing the network element.

29. The machine-readable storage medium of claim 27 wherein transmitting the second set of MIB data comprises direct memory access (DMA) writing the second set of MIB data.

30. The machine-readable storage medium of claim 27 further comprising writing a set of one or more tag bits at the end of the transmitted second set of MIB data, said set of tag bits indicating the end of the second set of MIB data.

31. The machine-readable storage medium of claim 27 further comprising:
collecting a third set of MIB data in the framer's memory;
in response to a request, collecting the third set of MIB data into a second memory; and
transmitting the collected third set of MIB data from the second memory across a bus to a third memory.

32. The machine-readable storage medium of claim 27 wherein the transmitting comprises packetizing the second set of MIB data.

33. A machine-readable storage medium that provides instructions, which when executed by a set of one or more processors, cause said set of processors to perform operations comprising:
in response to a request for management information base (MIB) data, accessing a first set of MIB data that is collected and maintained by a field programmable gate array (FPGA), wherein the MIB data is separate from a second set of MIB data that is used by the FPGA to periodically update the first set of MIB data;
collecting the second set of MIB data by a framer into a framer's memory, the framer separate from the FPGA, the framer to perform framing operations and maintain the second set of MIB data; and
direct memory access writing the first set of MIB data into a memory on a forwarding engine card by the FPGA.

34. The machine-readable storage medium of claim 33 further comprising packeting the first set of MIB data.

35. The machine-readable storage medium of claim 33 wherein the request is a write request from the forwarding engine card.

36. The machine-readable storage medium of claim 33 further comprising:
transmitting the first set of MIB data to a control engine from the memory on the forwarding engine card.

37. The machine-readable storage medium of claim 33 further comprising:
in response to a request from a control engine, communicating to the control engine the first set of MIB data's location in the memory on the forwarding engine card.

38. A machine-readable storage medium that provides instructions, which when executed by a set of one or more processors, cause said set of processors to perform operations comprising:
maintaining a first and second set of management information base (MIB) data in separate memory locations, wherein the first set of MIB data is based on received packets processed by a first circuit and the second set of MIB data is maintained by a second circuit based on the first set of MIB data;
accessing the second set of MIB data by the second circuit in response to a request for MIB data;
creating a set of one or more packets by the second circuit based on the second set of MIB data; and
direct memory access writing the set of packets by the second circuit across a bus into memory on a forwarding engine card
wherein the first circuit collects and maintains the first set of MIB data and the second circuit collects and maintains the second set of MIB data,
wherein the first circuit is a processing circuit of a framer and the second circuit is a field programmable gate array (FPGA) separate from the framer, and
wherein the second MIB is periodically updated with the first MIB data.

39. The machine-readable storage medium of claim 38 wherein the request is a write request from the forwarding engine card transmitted to the FPGA, the write request being transmitted in response to a request from a control engine.

40. The machine-readable storage medium of claim 38 wherein the request is provided in response to a time period expiring.

41. The machine-readable storage medium of claim 38 further comprising providing the second set of MIB data from the memory to a control engine.

42. The machine-readable storage medium of claim 41 wherein providing the second set of MIB data comprises communicating to the control engine the location of the second set of MIB data.

43. The machine-readable storage medium of claim 41 wherein the providing comprises packetizing the second set of MIB data written into the memory and transmitting the packetized second set of MIB data from the memory to the control engine.

* * * * *